United States Patent [19]

Samis

[11] Patent Number: 4,591,304

[45] Date of Patent: May 27, 1986

[54] ENGRAVING APPARATUS

[76] Inventor: Philip L. Samis, 1 Place Ville Marie Suite 1521, Montreal, Canada, H3B 2B5

[21] Appl. No.: 384,108

[22] Filed: Jun. 1, 1982

Related U.S. Application Data

[63] Continuation-in-part of Ser. No. 189,022, Sep. 22, 1980, Pat. No. 4,406,567.

[51] Int. Cl.⁴ .................. B23Q 35/10; B43L 13/10
[52] U.S. Cl. ........................... 409/92; 33/24.2; 409/90; 409/91
[58] Field of Search ............... 409/89, 90, 91, 92, 409/134, 86, 84, 130; 33/24 R, 24 B, 24 C, 23 K

[56] References Cited

U.S. PATENT DOCUMENTS

| | | | |
|---|---|---|---|
| 190,797 | 5/1877 | Ware | 33/24 B |
| 517,680 | 4/1894 | Chase | 409/92 |
| 742,180 | 10/1903 | Francis | 33/23 K |
| 1,036,526 | 8/1912 | Cordi et al. | 33/24 B |
| 1,148,397 | 7/1915 | Nelson | 409/134 X |
| 1,621,317 | 3/1927 | Eaton | 409/92 |
| 1,923,208 | 8/1933 | Howey | 409/92 |
| 2,344,849 | 3/1944 | Butler | 33/23 K X |
| 2,562,269 | 7/1951 | Gruettner et al. | 33/24 B |
| 2,699,606 | 1/1955 | Breau | 33/23 K X |
| 3,139,003 | 6/1964 | Magor | 409/130 |
| 4,166,319 | 9/1979 | Rosenberg | 409/92 X |
| 4,317,287 | 3/1982 | Sausale | 33/24 R |

Primary Examiner—Z. R. Bilinsky
Attorney, Agent, or Firm—Austin R. Miller

[57] ABSTRACT

Apparatus for scribe engraving a workpiece with a two dimensional miniature representation of a pattern followed by a stylus includes a stylus moveable within a two dimensional pattern, a base supporting the pattern, a sleeve receiving the stylus and extending upwardly therefrom with the stylus protruding from the sleeve, a spring biasing the stylus outwardly of the sleeve, a beam above the base including a bearing seat, a spherically rotatable pivot member residing on the bearing seat, a scribe connected to the pivot member and moving unitarily with the pivot member and a tube telescopingly connecting the sleeve with the pivot member for rotation of the pivot member in the seat in response to movement of the stylus following the pattern.

26 Claims, 9 Drawing Figures

ENGRAVING APPARATUS

CROSS REFERENCE TO RELATED PATENT APPLICATION

This patent application is a continuation-in-part of co-pending patent application Ser. No. 189,022, filed Sep. 22, 1980, now U.S. Pat. No. 4,406,567 and entitled Apparatus for Engraving Indicia on Small Objects.

BACKGROUND OF THE INVENTION

1. Field of the Invention

This invention relates to apparatus for engraving indicia on small workpieces in which an engraving scribe moves over the workpiece in the same direction as a stylus following the pattern which is to be engraved in greatly reduced form on the workpiece.

2. Prior Art Known to Applicant

The U.S. Pat. No. 4,317,287 discloses engraving apparatus and is acknowledged by applicant to be prior art, but only with respect to subject matter disclosed herein and not disclosed in the parent application hereto.

SUMMARY OF THE INVENTION

This invention provides apparatus for scribe engraving a workpiece with a miniature representation of a pattern in response to movement of a stylus following the pattern where the apparatus includes a spherically rotatable member, means connecting the scribe to the spherically rotatable member for unitary motion of the scribe with the rotatable member as the rotatable member rotates about a center of rotation in response to movement of the stylus following the pattern and telescoping means for mechanically connecting the rotatable member with the stylus so that the rotatable member rotates in response to stylus movement following the pattern. The telescoping means includes a holding member retaining the stylus for axial sliding movement with respect thereto and means for biasing the stylus axially towards the pattern whenever the holding member is within a preselected distance of the rotatable member. Gripping means are provided to tightly retain the workpiece in a supporting portion. Means are provided for moving the gripping means into position for engraving contact of the scribe with the workpiece in response to axial movement of a holding member with respect to the stylus, in opposition to a bias force applied to the stylus as the stylus follows the pattern. Also provided are positioning means for repeatedly locating the gripping means at the position for engraving contact of the scribe with the workpiece. The bias means resists relative axial movement of the holding means, towards the pattern, with respect to the stylus with force which increases with holding means movement towards the pattern. The means for moving the gripping means is actuated by the stylus contacting the pattern when distance from the pattern to an end of the holding member opposite the end thereof from which the stylus extends is less than a predetermined distance.

Different embodiments of patterns are useable with the same engraving apparatus. One embodiment of the pattern may include a two dimensional pattern supported by a base portion of the engraving apparatus with means provided for positioning the two dimensional pattern on the base and restraining the two dimensional pattern against movement in either of the two dimensions within which the stylus moves following the pattern. Means may be provided for laminating the two dimensional pattern against the base where the laminating means is interposed between the pattern and the stylus and receives the stylus for stylus movement thereover following the pattern.

In another embodiment of the pattern there is provided an apertured block mountable on the base below the stylus, means for locating the apertured block at a predetermined position on the base below the stylus and a plurality of interchangeable guide blocks, having alpha-numeric characters formed in an upwardly facingly surfaces thereof. Means are provided to retain the guide blocks against movement with respect to the base.

THE PREFERRED EMBODIMENTS OF THE INVENTION AND BEST MODE FOR PRACTICE THEREOF

Figure 1:
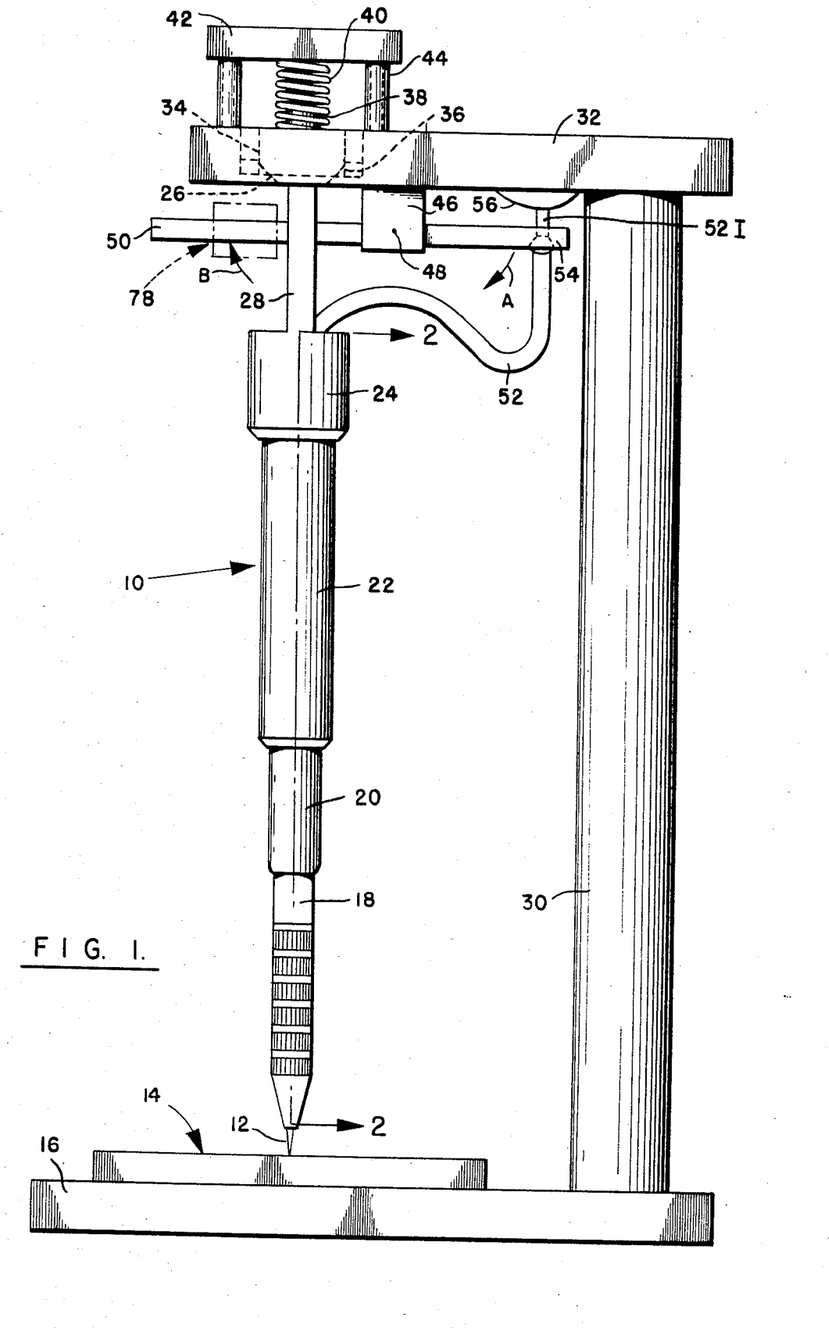
FIG. 1 is a side elevation of apparatus embodying the invention.

Engraving apparatus embodying aspects of the invention is illustrated in FIG. 1 and is designated generally 10 therein. Engraving apparatus 10 includes a stylus 12 adapted to follow a pattern, designated generally 14, mounted on a base 16 and retained thereon so that sliding movement of pattern 14 along base 16 is precluded. Stylus 12 is coaxially slidably retained within a knurled holder defined by an inner tube 18 which is received by an intermediate tube 20, an end of which opposite that receiving inner tube 18 is received by outer tube 22. The end of outer tube 22 opposite that receiving intermediate tube 20 is fixedly received by a connecting member 24 which is rigidly connected to a spherically rotatable pivot member 26 via forks 28. With this arrangement two dimensional movement of stylus 12 following pattern 14 results in spherical rotation of pivot member 26.

An upstanding support column 30 extends fixedly upwardly from base 16 and is laterally displaced from pattern 14 so as not to interfere with movement of stylus 12 thereover. A support beam 32 extends laterally from support column 30, over base 16, in cantilever fashion. Support beam 32 includes an aperture 34 therethrough which is preferably axially aligned with the tubular structure defined by the combination of stylus 12, inner tube 18, intermediate tube 20 and outer tube 22. Formed within aperture 34 is a seat 36 on which pivot member 26 rests.

Seat 36 is configured to permit spherical rotation of pivot member 26 over the range required to allow travel of stylus 12 over the surface of pattern 14. Accordingly, one suitable configuration of seat 36 is the right-angular configuration illustrated in dotted lines in FIG. 1 where the spherically curved outer surface of pivot member 26 rotatably contacts the right-angle corner defining the seat. Of course, seat 36 may extend annularly entirely around pivot member 34 or may be defined merely by three or four corners, appearing as cubical corners, upon which pivot member 26 may rest. Seat 36 can also be configured as an annular ring of frustro-spherical shape or any other shape permitting free spherical rotation of pivot member 26 over the range required to permit stylus 12 to trace the entirety of pattern 14. The center of rotation of pivot member 36 is above the lower surface of beam 32.

Pivot member 26 includes an upwardly extending knob 38. A coil spring 40, maintained in compression by pad 42 secured to support beam 32 by posts 44, fits about the exterior of knob 38 and biases pivot member 26 downwardly against seat 36. This retains pivot member 26 in position on seat 36 while permitting pivot member 26 to freely rotate about its center of rotation in response to movement of stylus 12 following pattern 14.

Forks 28 are fixedly received by pivot member 26.

A support block 46 is fixed to the underside of beam 32 and houses a fulcrum, designated schematically 48 in FIG. 1, to which a lever 50 is pivotally mounted. A flexible cable 52, which is operably connected to stylus 12, engages fitting 54 received in an end of lever 50 opposite the end most proximate pivot member 26. Flexible cable 52 preferably has inner and outer concentric sections, with the inner section being moveable axially with respect to the outer section. The outer section of cable 52 is secured to lever 50 by fitting 54 while the inner portion of cable 52, denoted 52I in FIG. 1, has an end abuttingly contacting a resilient means 56 secured to the underside of beam 32. Resilient means 56 may be a leaf spring, a piece of sponge rubber or any other material with similar resilient properties. Means 56 modulates variations in hand pressure applied to knurled holder 18 as such hand pressure is translated to lever 50 by flexible cable 52, as described in more detail hereinbelow.

Relative movement between inner section 52I and the outer, unnumbered portion of flexible cable 52, when inner portion 52I attempts to extend axially further upwardly with respect to fitting 54 in FIG. 1 while the outer portion of cable 52 remains fixed to fitting 54, causes fitting 54, and hence the end of lever 50 to which fitting 54 is fixed, to move downwardly, rotating about pivot 48 as indicated by arrow A in FIG. 1. This, of course, results in movement of the opposite end of lever 50 in the direction indicated by arrow B in FIG. 1.

Figures 2, 3:
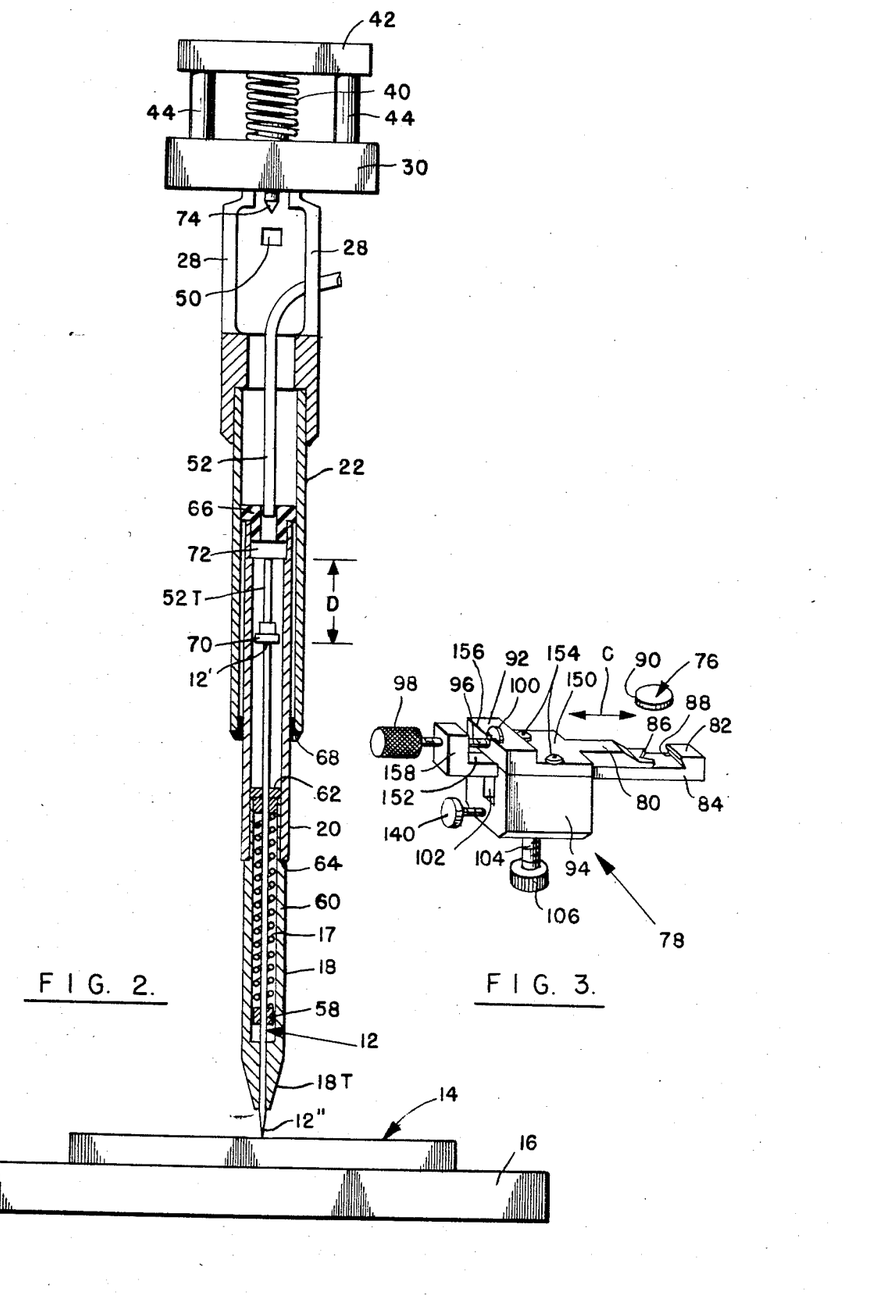
FIG. 2 is a front view, partially in section, of apparatus of FIG. 1 with the section taken at 2—2 in FIG. 1.
FIG. 3 is an enlarged view of workpiece holding apparatus embodying aspects of the invention.

As illustrated in FIG. 2, stylus 12 is retained coaxially within and is coaxially slidably moveable with respect to inner tube 18, with a portion of stylus 12 protruding from tapered end 18T of inner tube 18. A lower bushing 58 is secured to stylus 12 and abuts an end of a coil spring 60. Spring 60 is coiled about stylus 12 and is maintained in compression by abuttment, at the end thereof opposite lower bushing 58, against upper bushing 62 press fitted into the end of inner tube 18 opposite 18T. Stylus 12 passes slidably freely through a central aperture in upper bushing 62.

Inner tube 18 has a shoulder 64 formed externally thereabout against which a lower axial extremity of intermediate tube 20 abuts. Inner tube 18 is fixed with respect to intermediate tube 20 at the juncture of the two tubes; the two tubes move together as a unitary structure.

At the end of intermediate tube 20 opposite inner tube 18 is closure bushing 66 press fitted tightly within the interior of intermediate tube 20 and having exterior dimensions chosen to permit free sliding telescoping movement of intermediate tube 20 (and hence inner tube 18) with respect to outer tube 22.

The lower portion of outer tube 22 includes a guide bushing 68 fitted in collar-like fashion within the lower end of outer tube 22 and having an inner diameter selected to permit telescoping movement of intermediate tube 20 with respect to outer tube 22. Guide bushing 68 extends some distance in the axial direction with respect to outer tube 22; this axial elongation in combination with contact between closure bushing 66 and the inner surface of outer tube 22 prevents intermediate tube 20 from wobbling with respect to outer tube 22. Due to the rigid, unitary construction of the combination of inner tube 18 and intermediate tube 20 and the support for intermediate tube 18 provided by closure bushing 66 and guide bushing 68, the inner, intermediate and outer tubes 18, 20, 22 are maintained substantially coaxial during telescoping as stylus 12 follows pattern 14.

Flexible cable 52 is preferably of the type conventionally used as a shutter trip for cameras. These flexible cables have a slight spring bias of the inner cable portion 52I with respect to the outer portion of the flexible cable; the inner cable portion is moveable axially with respect to the outer cable portion. In the embodiment illustrated in FIG. 2, a plunger 70 affixed to the end of inner cable portion 52I abuts but is not fixed to an end 12' of stylus 12 opposite the end 12" following pattern 14.

Associated with flexible cable 52 is a collar 72. The outer portion of flexible cable 52 is immovable with respect to collar 72 but the inner portion 52I is moveable with respect to collar 72 and hence with respect to the outer cable portion upon depression of plunger 70. Collar 72 is retained within closure bushing 66 so that relative motion between collar 72, and hence the outer portion of flexible cable 52, and bushing 66 is precluded. Since bushing 66 is affixed to intermediate tube 20, relative motion between the outer portion of flexible cable 52 and intermediate tube 20 is prevented.

A scribe 74, which extends fixedly downwardly from pivot member 26, is illustrated in FIG. 2.

Figures 4, 9:
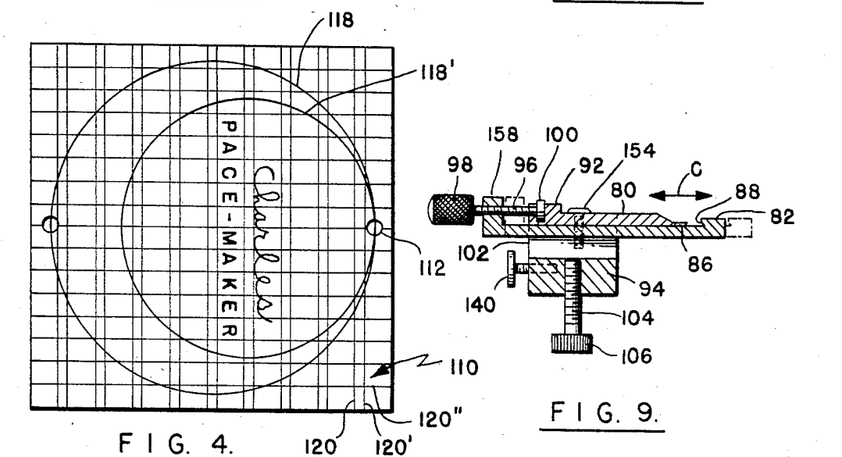
FIG. 4 is a top view of a pattern template for use with apparatus embodying the invention.
FIG. 9 is a vertical section of the apparatus illustrated in FIG. 3.

A workpiece which may be engraved utilizing the invention and a workpiece holder manifesting aspects of the invention are illustrated in FIG. 3 where the workpiece is a generally cylindrical chip or disk denoted 76. The workpiece holder is designated generally 78 and includes a pair of jaws 80, 82 where jaw 80 is fixed and jaw 82 is moveable back and forth in the direction indicated by double-ended arrow C. Fixed jaw 80 is part of a top plate member 150. Moveable jaw 82 is formed as part of a reciprocable plate member 84 which is slideably moveable within a channel machined in a support block 94. Respective fixed and moveable jaws 80, 82 have respective facing undercut jaw surfaces 86, 88; the undercuts are best seen in FIG. 9. The facing undercut jaw surface 88 of moveable jaw 82 is formed along a line transverse to the directions indicated by arrow C. The facing undercut jaw surface 86 of fixed jaw 80 is formed in a "Vee" shape, with the "Vee" disposed symmetrically with respect to the direction of travel defined by arrow C and the open end of the Vee facing moveable jaw 82, as shown in FIG. 3. When a workpiece 76 is positioned on plate member 84 and moveable jaw 82 is closed towards fixed jaw 80, facing undercut surfaces 86, 88 tightly press against the curved lateral surface 90 of workpiece 76, retaining workpiece 76 immovably with respect to workpiece holder 78.

The longitudinally elongated plate member 84 resides in a rectangular channel, not numbered, machined in support block 94, and is moveable slidably therealong in the directions indicated by double ended arrow C. Elongated plate 84 is retained within the channel formed in support block 94 by sandwich action of a top plate 150 which is retained against an upper surface 152 of plate member 84 by screws 154 passing through holes in top plate 150 and received by threaded bores in support block 94. Fixed jaw 80 is an extension of top plate 150 and has a planar underside for slidable facing contact with surface 152 of moveable elongated plate 84. Top plate 150 further includes a built-up portion 156 in which is formed a T-shaped slot, not numbered, receiving a circular disk 100 in the top portion of the T for rotatary movement of a disk 100 with respect thereto. Disk 100 is fixed to a threaded shaft 96 to which is connected a knurled knob 98 at the end opposite disk 100 for unitary rotation by these three members 96, 98, 100.

An upstanding shoulder 158 of elongated plate 84 extends upwardly with respect to planar surface 152 and has formed therein a threaded passageway for threaded engagement with shaft 96. The threaded passageway is parallel with the direction of movement of elongated plate 84 as defined by the rectangular channel machined into support block 94. Rotation of knurled knob 98, resulting in rotation of threaded shaft 96 with respect to upwardly extending shoulder portion 158, produces movement of plate member 84 in the direction indicated by arrow C as shoulder portion 158 moves along shaft 96. This movement of plate member 84 results because circular disk 100 is retained within and is rotatable with respect to built-up portion 156 of top plate 150 but is not moveable, in the directions indicated by arrow C, with respect thereto. Consequently, upon rotation of shaft 96 plate member 84 moves as indicated by arrow C.

A rectangular cross-section passageway 102 is provided in support block 94 for receipt thereby of lever 50. Gripping means 78 can be moved along lever 50 to position workpiece 76 underneath scribe 74 for engraving the workpiece. A bolt 104 threadedly engages an internally threaded vertical bore in support block 94, which bore communicates with passageway 102 so that bolt 104 can be tightened against lever 50 to retain gripping means 78 in a selected position for engraving of workpiece 76 by scribe 74.

A positioning screw 140 threadedly engages an internally threaded horizontal bore formed in support block 94, which horizontal bore is parallel with and preferably disposed below passageway 102. The threaded horizontal bore is located so that the head of positioning screw 140 interferes with lever 50 after lever 50 has been inserted through passageway 102, from right to left in FIG. 3. By rotating positioning screw 140 and thus moving the head of screw 140 in the directions indicated by arrow C, thereby varying the distance from fixed jaw 80 at which lever 50 interferes with screw 140, gripping means 78 can be repeatedly located in the same position along lever 50, for successful engraving of workpiece 76.

Movement of plate member 84 and hence moveable jaw 80 is illustrated schematically in FIG. 9, where plate member 84 is shown in two different positions, one in section and one in phantom.

Rotation of knob 98 provides venier action permitting moveable jaw 82 to be tightened to the desired amount against workpiece 76.

A feature of major importance is the tactile sensation provided to the operator when the operator actuates inner tube 18 (1) to rotate lever 50 and contact workpiece 76 with stylus 74 and (2) to guide stylus 12 along pattern 14.

When an operator first grasps inner tube 18, in the manner of grasping a conventional lead pencil when preparing to write, the unitary combination of inner tube 18-intermediate tube 20 is axially freely moveable, with respect to outer tube 22, and workpiece 76 is remote from scribe 74. As the user moves inner tube 18 and hence stylus 12 downwardly, downward movement of the combination of inner tube 18-intermediate tube 20 is smooth, sliding movement with the only resistance provided by sliding contact between intermediate tube 20 and the interior of guide bushing 68 and the interior of outer tube 22 and closure bushing 66. As the combination of inner tube 18-intermediate tube 20 continues downward, once stylus 12 contacts pattern 14 the operator, holding inner tube 18 in the same manner as a pencil, exerts slight downward pressure, similar to the pressure exerted when writing.

This downward pressure compresses spring 17 between upper bushing 62, which is affixed to and hence moves unitarily with inner tube 18, and lower bushing 58, which is fixed to stylus 12. Specifically, since stylus 12 is in contact with pattern 14, stylus 12 and hence lower bushing 58 cannot move vertically downwardly. However, inner tube 18 and hence upper bushing 62 can move downwardly, with respect to stylus 12, in response to the operator-applied pressure since stylus 12 is slidably coaxially resident within inner tube 18 and cannot move downwardly in response to the operator-applied pressure. This results in relative vertically upward movement of stylus 12 with respect to the unitary combination of inner tube 18-intermediate tube 20, with bushing 58 compressing spring 17 and stylus 12 pushing against plunger 70 thereby decreasing distance D in FIG. 2. (Distance D is the distance between moveable plunger 70 and fixed collar 72—which is stationary due to the connection with bushing 66.)

As plunger 70, which is fixed to inner portion 52I of flexible cable 52, moves vertically upwardly in FIG. 2, inner cable portion 52I attempts to move axially upwardly (with respect to the outer portion of flexible cable 52 and hence with respect to fitting 54 in FIG. 1) against resilient means 56 resulting in downward movement of the end of lever 50 retaining fitting 54. This produces rotation of lever 50 about fulcrum 48 in directions indicated by arrows A and B in FIG. 1 thereby urging the workpiece 76 into engagement with scribe 74. (Once workpiece 76 has been contacted with scribe 74, the operator proceeds with the engraving operation by following the selected pattern 14 with stylus 12. Workpiece holder 78 of FIG. 3 has not been illustrated positioned on lever 50 in either FIG. 1 or 2 to facilitate clarity in the drawings.)

When the operator has finished engraving by completely following pattern 14 with stylus 12, the operator lifts inner tube 18 vertically upwardly. This permits spring 17 to relax thereby causing relative downward motion of stylus 12 with respect to inner tube 18 in FIG. 2. This results in an increase in distance D in FIG. 2 with consequent rotation of lever 50 about fulcrum 48 in a direction opposite that indicated by arrows A and B in FIG. 1, thereby removing workpiece 76 from contact with scribe 74. As the operator continues to raise holder 18 from pattern 14, spring 17 elongates and urges bushing 58 against the lower interior extremity of holder 18. Continued lifting of holder 18 with respect to pattern 14 results in stylus 12 being lifted from pattern 14, since stylus 12 and holder 18 move unitarily when spring 17 has urged bushing 58 against the lower interior extremity of holder 18 with stylus 12 protruding a maximum distance out of tip portion 18T of holder 18.

Outer tube 22 is tightly retained within connecting member 24; no relative motion therebetween is possible.

If pattern 14 is removed or if holder 18 is displaced laterally, allowing spring 17 to elongate and to urge bushing 58 against a lower interior extremity of holder 18, the inner tube 18-intermediate tube 20 combination is freely telescopingly moveable within outer tube 22. Only when stylus 12 is pressed against a pattern and forced to slightly retract within holder 18, against bias of spring 17, by exertion of downward pressure on holder 18 in the act of guiding stylus 12 along the pattern, does stylus 12 contact plunger 70 and, as a result, rotate lever 50 to position the workpiece against scribe 74. Note that so long as stylus 12 is pressed against pattern 14 by application of force to holder 18, lever 50 is displaced and maintains the workpiece in engraving contact with scribe 74. This is important since scribe 74, being fixed to pivot member 36, actually moves in a curved plane of frusto-spherical configuration, while workpiece 76 is preferably planar. Thus the apparatus facilitates engraving of a two dimensional pattern onto a flat workpiece with a scribe which moves in a curved two dimensional plane.

The inner tube 18-intermediate tube 20 combination may be lifted vertically upward in FIG. 2 to a position at with tip 18T is sufficiently removed from pattern 14 that stylus 12 protrudes the maximum distance from tip 18 and spring 17 forces bushing 58 against the lower interior extremity of holder 18. At such position the inner tube 18-intermediate tube 20 combination is again freely telescopingly moveable within outer tube 22 and lever 50 is positioned with the workpiece removed from scribe 74.

Note that in the absence of compression of spring 17, distance D in FIG. 2 remains fixed with no relative movement resulting between inner and outer portions of flexible cable 52. In the absence of such relative movement between the inner and outer portions of flexible cable 52, lever 50 remains positioned so that the workpiece holder 78, and hence the workpiece 76, is remote from scribe 74. Consequently the combination of stylus 12, spring 17, the inner tube 18-intermediate tube 20 combination, flexible cable 52, bushings 58 and 66 and the associated structure actuate lever 50 only when the inner tube 18-intermediate tube 20 combination is at an intermediate position along the axial length of outer tube 22.

If the inner tube 18-intermediate tube 20 combination is too close to the upper extremity of outer tube 22, stylus 12 protrudes the maximum amount from tip 18T in response to bias of spring 17 because tip 18T is further removed from pattern 14 than the maximum distance stylus 12 can protrude from inner tube 18. Consequently, no reduction in distance shown as D in FIG. 2 results with consequent lack of rotation of lever 50 about fulcrum 48. Similarly, if the inner tube 18-intermediate tube 20 combination is located too close to the lower end of outer tube 22 in FIG. 2 (this can result if the telescoping combination of tubes 18, 20 and 22 is swung about pivot member 26, laterally of base 16), spring 17 again elongates, urging bushing 58 against the lower interior extremity of tube 18, forcing stylus 12 to protrude out of holder 18 by the maximum amount; no reduction in distance D results. Without a reduction in distance D, no relative motion results between the inner and outer portions of flexible cable 52 and, consequently, there is no rotation of lever 50 about fulcrum 48.

Figure 5:
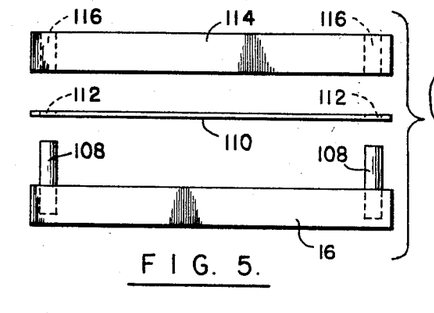
FIG. 5 is an exploded view illustrating the pattern template of FIG. 4 retained in position.
Figure 6:
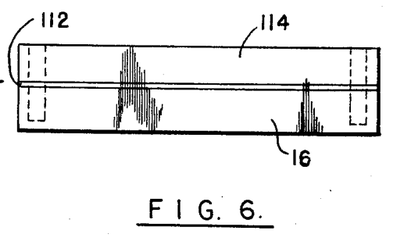
FIG. 6 is a view of components illustrated in FIG. 5 in assembled condition.

FIGS. 4, 5 and 6 together illustrate an embodiment of a pattern 14 which can be used with engraving apparatus illustrated in FIGS. 1, 2 and 3. In FIGS. 4, 5 and 6 base 16 has two posts 108 protruding therefrom on opposite sides. A paper pattern template 110 includes apertures 112 of suitable diameter for fitting over posts 108 to position template 110 on base 16. A laminating sheet 114 having apertures 116 with diameters corresponding to those of apertures 112 may be provided for sandwiching paper pattern template 110 against base 16. The completed sandwich is illustrated in FIG. 6.

Paper pattern template 110 may include circular indicia 118, 118' which indicate the pattern boundary corresponding to circular edge 90 of workpiece 76. When an operator is engraving a workpiece 76 utilizing a paper pattern template 10 as illustrated in FIG. 4, the operator cannot position stylus 12 outside of the appropriate circle or scribe 74 will no longer contact the circular surface of workpiece 76 to be engraved. As illustrated, two circular indicia, corresponding to two different diameter workpiece chips 76 to be engraved, may be provided on one template. Similarly, sets of horizontal and vertical lines 120, 120' 120" may be provided on template 110 for guiding the individual operator creating the pattern to be engraved.

For instance an individual may write his or her name on a line 120 in script as shown in the drawings. This may be above or below an identification mark or name which has been preprinted on the paper template. The template may then be positioned in the sandwich, between base 16 and laminating sheet 114, whereupon an operator may engrave a miniature representation of the script and the pre-printed mark or name on a workpiece chip 76 by following the script and the pre-printed mark with the stylus.

The invention has been used to engrave chips of both 0.020 and 0.025 inch diameter. The paper pattern template illustrated in FIG. 4 with two circular indicia has the indicia tangent so that the template may be used with either diameter chip. The tangent nature of the pattern results from the fact that a chip to be engraved is always pressed against stationary jaw 80 by moveable jaw 82 in workpiece holder 78. Consequently chips of different diameters have their centers at different positions on plate 84 during engraving. However chips of different diameters rest against the same surface of fixed jaw 80, which provides a reference position corresponding to the point of tangency between the two circles illustrated in FIG. 4.

Figure 7:
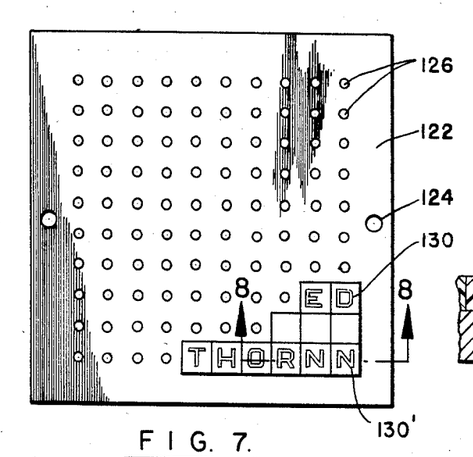
FIG. 7 is a top view of an alternate embodiment of a pattern for engraving with apparatus of the invention.
Figure 8:
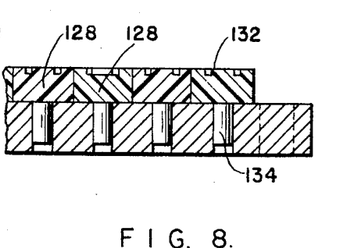
FIG. 8 is a partial sectional view taken at 8—8 in FIG. 7.

Another embodiment of a pattern, denoted generally 14 is illustrated in FIGS. 7 and 8. In this embodiment a regularly apertured plate 122 has fitting apertures 124 sized for fitting over positioning posts 108 on base 16 in FIG. 5. Plate 122 includes a plurality of regularly, symmetrically spaced apertures 126, referred to as lettering apertures to distinguish them from apertures 124. A plurality of interchangeable guide blocks 128 are provided with each guide block 128 having at least one alphanumeric character 130 formed in an upwardly facing surface 132 thereof. Each alphanumeric character 130 is preferably engraved on or otherwise recessed within surface 132 so that each guide block 128 includes a protruding male member 134 sized for fitting into one of lettering apertures 126.

An operator can form any desired pattern utilizing a plurality of guide blocks 128. If the guide blocks are abutted one against another, they retain each other in position as the stylus is moved from block to block to follow the alphanumeric characters which the operator desires to engrave onto the workpiece. Alternately, the guide blocks 128 or just the male member portions 134 thereof, may be manufactured of flexible rubber, plastic or a similar resilient material so that male member portions 134 may be force fitted into lettering apertures 126, to retain guide blocks 128 in position.

The engraving apparatus of the invention may be used with either of the embodiments of pattern 14 illustrated in FIGS. 4 through 8 or with any other suitable pattern.

Workpieces engraved utilizing apparatus disclosed herein may be placed in dentures or in natural teeth. The workpieces may be engraved with identification data, such as the patient's name and social security number, the tooth shade and mold data, the patent's dentist's name, with critical health information concerning allergies, blood type, diabetic or epileptic status, presence of a pacemaker or other vital prostheses or with other important data such as credit card numbers, passport numbers, safe deposit box numbers and the like. The workpieces may be supplied in different colors and/or may be made of different materials and different types of data may be engraved on workpieces of each color and/or material. Several workpieces containing different types of information may be implanted in the patent's dentures or in the natural teeth.

Use of the engraving apparatus of the invention is not limited to workpieces which are implanted into dentures or natural teeth.

As with the apparatus disclosed in the parent application hereto, locating the workpiece below the center of rotation of the pivot member and hence of the scribe insures that movement of the scribe over the workpiece is always in a direction corresponding to that of the stylus over the pattern. Specifically, a forward writing effect results in which the scribe moves unitarily in response to stylus movement so that left-to-right and front-to-rear movement of the stylus over the pattern respectively produces left-to-right and front-to-rear engraving of the chip by the scribe.

The familiar force-distance characteristic of coil springs provides the characteristic of the invention whereby as the user applies increasing downward force to inner tube 18, increasing resistance to further downward movement of inner tube 18 results from compression of coil spring 17.

For a given geometry of workpiece holder 78 and lever 50, indicia may be provided on lever 50 to facilitate accurate positioning of workpiece holder 78 therealong so that the scribe and the workpiece may properly engage for successful workpiece engraving upon rotation of lever 50 moving workpiece 76, as carried by workpiece holder 78, into position for engraving by scribe 74. The "double slip" effect provided by telescoping action of inner tube 18-intermediate tube 20 combination within outer tube 22 and increasing resistance provided by spring 17 as the user urges inner tube 18 downwardly, pressing stylus 12 against the pattern, produces a natural writing feel. Initial lowering of the inner tube 18-intermediate tube 20 combination, and hence of stylus 12, places the point of stylus 12 on the pattern as inner tube 18-intermediate tube 20 combination slides freely within outer tube 22; only a slight, sliding resistance is experienced by the user in moving the inner tube downwardly to position the stylus on the pattern. Increased resistance is experienced as the user urges inner tube 18 downwardly against force of spring 17; this provides the realistic, natural writing feel.

Workpiece chip 76 may be plated with different colors for color coding according to the type of information on a given chip—critical health information might be on a blue chip while miscellaneous information might be on a gold chip.

A major advantage provided by this invention is that the apparatus can be operated with one hand and provides the forward writing effect, permitting lay people to operate the apparatus. The forward writing effect in combination with the natural writing feel provided by the apparatus makes the user psychologically comfortable following the pattern with the stylus, thereby engraving the chip with the scribe. This is especially important when an older person, for instance in a dentist's office, utilizes the engraving apparatus to engrave a miniature representation of their name, which he or she has previously written on a paper template portion 110 of pattern 14, onto a workpiece chip 76.

As yet another design for pattern 14, there may be provided a series of running channels on base 16, between which guide blocks having upwardly facing alphanumeric indicia found therein, preferably as depressions in the upwardly facing surface of the blocks, may fit. The alphanumeric characters preferably have rounded corners to facilitate tracking with the stylus. The channels between which the guide blocks fit may be plastic or metal. It is desirable that the guide blocks, fitted between the channels, be a compressible, resilient material such as rubber.

The paper template 110 may include a preferably clear plastic laminate, scored at one corner thereof, to permit peel-off of the clear plastic. If the clear plastic laminate material has a moderately sticky adhesive on the underside, this may thereafter be pressed against the chip to provide a handle for the small chip, which handle is more easily grasped by adult fingers than is the chip since the chip may be very small.

I claim:

1. Apparatus for scribe engraving a workpiece with a miniature representation of a pattern in response to movement of a stylus following said pattern, comprising:
   a. a spherically rotatable member;
   b. means connecting said scribe to said spherically rotatable member for motion of said scribe with said rotatable member as said rotatable member rotates;
   c. telescoping means for connecting said rotatable member with said stylus so that said rotatable member rotates in response to stylus movement following said pattern, including;

1. a holding member providing means for retaining said stylus for axial sliding stylus movement with respect thereto; and
2. means within said retaining means for biasing said stylus axially towards said pattern and limiting distance said stylus protrudes from said holding member to a predetermined maximum which is less than length of said stylus, to affect contact of said pattern by said stylus whenever said holding member is within a preselected range of distances of said rotatable member;

d. said telescoping means further comprising means connecting said holding member with said spherically rotatable member;
e. said holding member being slidably coaxially moveable with respect to said connection means and said stylus biasing and limiting means;
f. said holding member and said connecting means being coaxial.

2. Apparatus for scribe engraving a workpiece with a miniature representation of a pattern followed by a stylus, comprising:
   a. a spherically rotatable pivot member;
   b. means for supporting said spherically rotatable pivot member, including a seat for rotation of said pivot member thereabout;
   c. means connecting said scribe to said spherically rotatable pivot member for unitary motion of said scribe with said pivot member as said pivot member rotates;
   d. telescoping means for mechanically connecting said rotatable pivot member with said stylus, including:
      i. a holding member retaining said stylus, a portion of said stylus extending axially therefrom;
      ii. means for biasing said stylus outwardly of said holding member;
      iii. means connecting said holding member with said spherically rotatable member, said holding member freely telescopingly engaging said connecting means;
   e. gripping means for tightly retaining said workpiece in a supporting portion thereof;
   f. means for moving said gripping means into position for engraving contact of said scribe with said workpiece in response to axial movement of said holding member with respect to said stylus, in opposition to said bias means, as said stylus follows said pattern.

3. Apparatus of claim 2 wherein said moving means is actuated by said stylus contacting said pattern when distance from said pattern to an end of said holding member opposite the end thereof from which said stylus extends is less than a predetermined distance.

4. Apparatus of claim 3 wherein said bias means resists relative axial movement, towards said pattern, of said holding means with respect to said stylus with force which increases with holding means movement towards said pattern.

5. Apparatus of claim 4 wherein said force increases proportionally to said holding means movement.

6. Apparatus of claim 2 wherein said moving means is rotatable about a pivot, wherein said gripping means is movable along said moving means with respect to said pivot and includes jaws for holding said workpiece, vernier means for closing said jaws against said workpiece and means for adjustably retaining said gripping means at a selected position on said moving means.

7. Apparatus for scribe engraving a workpiece with two dimensional miniature representation of a pattern followed by a stylus, said scribe moving unitarily in response to stylus movement along said pattern so that left-to-right and front-to-rear movement of said stylus produces respective left-to-right and front-to-rear movement of said scribe on said workpiece, comprising:
   a. a stylus movable within a two dimensional pattern;
   b. a base for supporting said pattern;
   c. a sleeve receiving said stylus and extending upwardly therefrom, said stylus protruding from said sleeve;
   d. a spring within said sleeve biasing said stylus downwardly, outwardly of said sleeve;
   e. a support member extending upwardly from said base, displaced laterally from said stylus, said sleeve and the portion of said base which supports said pattern;
   f. a cantilever beam extending horizontally from said vertical support above said base;
   g. said beam including a bearing seat;
   h. a spherically rotatable pivot member residing within said bearing seat, said pivot member being freely spherically rotatable about a center while residing within said seat;
   i. said scribe connecting with said pivot member and moving in response to pivot member movement;
   j. means telescopingly connecting said sleeve with said pivot member for rotation of said pivot member in said seat in response to two dimensional movement of said stylus following said pattern;
   k. said sleeve and said connecting means telescoping over a range of length sufficient to permit said stylus to disengage from said pattern and yet have said sleeve and said connecting means remain in telescoping engagement;
   l. a lever connected to said beam for pivotal motion with respect thereto;
   m. a workpiece support adjustably movable along said lever, for selectably retaining said workpiece immovably with respect to said lever; and
   n. means for rotating said lever with respect to said beam to position said workpiece against said scribe in response to relative movement of said sleeve with respect to said stylus in opposition to force exerted by said spring.

8. Apparatus of claim 7, wherein said means pivotally moving said lever with respect to said beam includes means for moving said workpiece away from said scribe upon relative axial movement of said holding member with respect to said stylus away from said pattern.

9. Apparatus of claim 8, wherein said scribe is elongated and fixedly extends from said pivot member below the horizontal.

10. Apparatus of claim 7, wherein said seat has a right angular configuration.

11. Apparatus of claim 7, wherein said workpiece support comprises:
   a. a pair of workpiece holding jaws, one of said jaws being fixed and the other of said jaws being movable laterally with respect to said fixed jaw;
   b. vernier means for laterally moving said moveable jaw with respect to said fixed jaw in response to hand rotation of said vernier means;
   c. adjustable hand screw means for maintaining said workpiece support at a selected position along said lever.

12. Apparatus of claim 7, further comprising means for biasing said pivot member against said bearing seat.

13. Apparatus of claim 7, further comprising:
   a. a two-dimensional pattern supported by said base;
   b. means for positioning said two dimensional pattern on said base; and
   c. means for laminating said two dimensional pattern against said base;
wherein said laminating means is between said pattern and said stylus and receives said stylus for stylus movement thereover following said pattern.

14. Apparatus of claim 13, wherein said laminating means is transparent.

15. Apparatus of claim 7, further comprising:
   a. an apertured support block mountable on said base below said stylus;
   b. means for locating said support block at a predetermined position on said base below said stylus;
   c. a plurality of interchangeable guide blocks each having at least one alphanumeric character formed in upwardly facing surface thereof and having a male member protruding from a surface opposite said upwardly facing surface, said male member being adapted for force fitting receipt by one of said apertures in said support block;
wherein a selected plurality of said blocks define said pattern when said male members of said selected blocks are received by said apertures in said support block.

16. Apparatus for scribe engraving a chip with a two dimensional miniature representation of a pattern followed by a stylus, said scribe moving unitarily in response to stylus movement over said pattern so that left-to-right and front-to-rear movement of said stylus over said pattern respectively produces left-to-right and front-to-rear engraving of said chip by said scribe, comprising:
   a. a stylus movable to follow a two dimensional pattern;
   b. a base for supporting said pattern;
   c. a sleeve receiving said stylus and extending upwardly therefrom, said stylus protruding telescopically from said sleeve;
   d. a spring, within said sleeve, for biasing said stylus downwardly, outwardly of said sleeve;
   e. a support extending upwardly from said base, displaced laterally from said stylus and from a portion of said base adapted to support said pattern;
   f. a cantilever beam extending horizontally from said support above said base;
   g. a right angular bearing seat formed in said beam above said base;
   h. a spherically freely rotatable pivot member residing within said bearing seat;
   i. said scribe being fixedly connected with said pivot member and moving unitarily therewith;
   j. a tube telescopically connecting said sleeve with said pivot member for rotation of said pivot member in said seat in response to two dimensional movement of said stylus over said pattern;
   k. said sleeve and said tube telescoping over a range sufficient to permit said stylus to disengage said pattern while said sleeve and said tube remain in telescoping engagement;
   l. a lever connected centrally via a fulcrum to said beam for pivotal motion with respect thereto;
   m. gripping means adjustably movable along a first portion of said lever, for selectably retaining said chip immovably with respect to said lever at a position for engaging contact of said chip with said scribe comprising:
      1. a pair of chip holding jaws, one of said jaws being fixed and the other being movable axially with respect to said fixed jaw;
      2. support structure to which said fixed jaw is secured and along which said movable jaw moves;
      3. vernier means for axially moving said movable jaw with respect to said fixed jaw in response to rotation of said vernier means and;
      4. adjustable screw means for maintaining said gripping means at a selected position along said lever for engraving contact of said chip by said scribe upon rotation of said lever about said fulcrum in response to pressure exerted downwardly on said sleeve; and
   n. a flexible cable having axially independently movable inner and outer portions, a first end of said outer portion being connected to an end of said sleeve opposite that from which said stylus protrudes and a second end of said outer portion being connected to a second portion of said lever oppositely disposed with respect to said fulcrum from said first portion, a first end of said inner portion of said flexible cable abuttingly contacting an end of said stylus remote said pattern and a second end of said inner portion contacting resilient means carried by said beam so that upon relative movement of said inner portion with respect to said outer portion, upon displacement of said inner portion by said stylus as said stylus moves vertically upwardly with respect to said sleeve in response to operator applied pressure exerted downwardly on said sleeve, said cable inner portion at said second end moves axially with respect to said outer portion against said resilient means mounted on said beam, rotating said lever about said fulcrum.

17. Engraving apparatus having scribing means engraving a work piece with a reproduction of a pattern in response to a stylus following said pattern, said scribing means moving in unison with said stylus so that left-to-right and front-to-rear stylus movement respectively produces left-to-right and front-to-rear scribing means movement, comprising:
   a. a stylus movable within said pattern;
   b. a telescoping connecting member receiving said stylus and extending oppositely therefrom;
   c. means for biasing said stylus out of said telescoping connecting member towards and into contact with said pattern upon sufficient telescoping movement of said connecting member towards said pattern;
   d. a spherically rotatable pivot member positioned remote said stylus, receiving an end of said connecting member opposite said end of said connecting member receiving said stylus;
   e. said scribing means extending from said pivot member at a position intermediate the center of rotation thereof and said stylus, said scribing means being movable unitarily with said pivot member; and
   f. means for biasing said workpiece against said scribing means, as said stylus follows said pattern, in response to axial movement of said telescoping connecting member moving said stylus towards and into contact with said pattern.

18. Apparatus for scribe engraving a workpiece with a miniature representation of a pattern in response to movement of a stylus following said pattern, including:
   a. a spherically rotatable member;

b. first means connecting said scribe to said spherically rotatable member for motion of said scribe as said rotatable member rotates;

c. second means for connecting said rotatable member with said stylus so that said rotatable member rotates in response to stylus movement following said pattern, including telescopingly engaging members, said stylus being biased outwardly of one of said telescoping members with force which increases as said telescoping members extend through a selected range of positions;

d. means for contacting said workpiece with said scribe whenever said stylus is within a preselected range of distances from said rotatable member;

e. means for biasing said stylus, with respect to said second connecting means, towards said pattern;

f. said stylus being biased outwardly of said one of said telescoping members with force independent of movement of said telescoping member outside of said selected range of positions;

wherein said contacting means includes workpiece gripping means movable along a rotatable beam portion of said contacting means, said workpiece gripping means including jaws for holding said workpiece, vernier means for urging said jaws against said workpiece and means for adjustably retaining said gripping means at a selected position on said contacting means beam portion.

19. A method for scribe engraving a workpiece with a miniature reproduction of a pattern followed by a stylus, including the steps of:
   a. contacting said pattern with said stylus;
   b. increasing force with which said stylus contacts said pattern to thereby effect scribe-workpiece contact;
   c. moving said stylus over said pattern and simultaneously moving said scribe over said workpiece in unison with said stylus so that left-to-right and front-to-rear stylus movement respectively produces left-to-right and front-to-rear scribe movement on said workpiece, with continued application of said increased force to said stylus; and
   d. reducing substantially to zero said force with which said stylus contacts said pattern to thereby effect disengagement of said scribe and workpiece.

20. Apparatus for scribe engraving a workpiece with a miniature representation of a pattern in response to movement of a stylus following the pattern, comprising:
   a. a spherically rotatable member;
   b. means for connecting the rotatable member with the stylus so that the rotatable member rotates in response to stylus movement following the pattern, including:
      i. a holding member retaining the stylus for axial sliding stylus movement with respect thereto; and
      ii. means for biasing the stylus axially towards said pattern;
   c. means connecting said scribe to the spherically rotatable member for motion of the scribe with the rotatable member as the rotatable member rotates, the scribe being located intermediate the center of rotation of the rotatable member and the pattern;
   d. gripping means for selectably retaining the workpiece immovably with respect to the scribe for engraving contact of the workpiece with the scribe when the gripping means retaining said workpiece is moved to a position where the scribe contacts the workpiece, comprising:
      i. workpiece holding jaws, at least one of the jaws being movable with respect to a remaining jaw, for retaining the workpiece therebetween when the movable jaw is moved towards said remaining jaw;
      ii. a support for the remaining jaw, along which the movable jaw moves;
      iii. vernier means for moving the movable jaw with respect to the remaining jaw in response to operator finger motion applied thereto; and
      iv. adjustable means for selectably maintaining the gripping means at a selected position with respect to the scribe for contacting the workpiece with the scribe upon application of bias means to the gripping means to move the workpiece retained by said gripping means against said scribe by movement of the gripping means;
   e. the bias means biasing the workpiece retained by the gripping means against the scribe in response to operator applied stimulus.

21. Apparatus of claim 20 wherein the remaining jaw is fixed with respect to the movable jaw.

22. Apparatus of claim 21 wherein one of the jaws in undercut transversely to the direction of motion of the movable jaw; wherein another of the jaws has a v-shape configuration opening towards the first-mentioned jaw and is undercut, the first and second mentioned jaws being adapted to retain a circular disk-like workpiece therebetween; wherein the vernier means includes a rotatable threaded shaft, the movable jaw being connected to a member threadedly engaging the rotatable shaft for movable jaw member movement upon shaft rotation.

23. Apparatus of claim 22 wherein the axis of said shaft defines direction of movement of the movable jaw.

24. Apparatus of claim 22 wherein said gripping means further includes means for retaining said gripping means at a preselected position along a rotatable lever portion of said bias means, said gripping means including a passageway for receipt of said lever portion of said bias means, said retaining means communicating with said passageway and transversely tightly contacting the lever portion to preclude movement of said lever portion relative to said passageway.

25. Apparatus of claim 24 wherein said gripping means further includes means for locating said gripping means at a preselected position along said lever means.

26. Apparatus of claim 25 wherein said locating means is a member interfering with said lever means upon lever means movement along said passageway in said gripping means.

* * * * *

UNITED STATES PATENT AND TRADEMARK OFFICE
CERTIFICATE OF CORRECTION

PATENT NO. : 4,591,304
DATED : May 27, 1986
INVENTOR(S) : Philip L. Samis

It is certified that error appears in the above-identified patent and that said Letters Patent is hereby corrected as shown below:

Column 7, line 40, delete "with" and insert --which--.

Column 8, line 30, delete "10" and insert --110--.

Signed and Sealed this

Fifteenth Day of September, 1987

Attest:

DONALD J. QUIGG

Attesting Officer

Commissioner of Patents and Trademarks